United States Patent
Manion et al.

(10) Patent No.: US 7,139,760 B2
(45) Date of Patent: Nov. 21, 2006

(54) PEER-TO-PEER RECORD STRUCTURE AND QUERY LANGUAGE FOR SEARCHING AND DISCOVERY THEREOF

(75) Inventors: Todd R. Manion, Redmond, WA (US); Scott A. Senkeresty, Duvall, WA (US); Robert D. Donnor, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 10/351,726

(22) Filed: Jan. 27, 2003

(65) Prior Publication Data

US 2004/0148287 A1 Jul. 29, 2004

(51) Int. Cl.
*G06F 17/30* (2006.01)

(52) U.S. Cl. ............................ 707/10; 707/3
(58) Field of Classification Search .......... 707/1–10, 707/100–104.1, 200–206; 709/202, 218; 342/357.09
See application file for complete search history.

(56) References Cited

U.S. PATENT DOCUMENTS

| | | | |
|---|---|---|---|
| 5,987,376 A | | 11/1999 | Olson et al. |
| 6,513,059 B1 * | | 1/2003 | Gupta et al. ............ 709/202 |
| 6,643,650 B1 * | | 11/2003 | Slaughter et al. ........ 707/10 |
| 6,865,599 B1 * | | 3/2005 | Zhang .................... 709/218 |
| 6,950,821 B1 * | | 9/2005 | Faybishenko et al. ..... 707/10 |
| 2002/0143989 A1 | | 10/2002 | Huitema et al. |
| 2003/0055892 A1 | | 3/2003 | Huitema et al. |
| 2003/0056093 A1 | | 3/2003 | Huitema et al. |
| 2003/0056094 A1 | | 3/2003 | Huitema et al. |
| 2003/0196060 A1 | | 10/2003 | Miller |
| 2004/0111469 A1 | | 6/2004 | Manion et al. |
| 2004/0111515 A1 | | 6/2004 | Manion et al. |

OTHER PUBLICATIONS

Adam Langley, *The Freenet Protocol*, The Free Network Project, at http://freenet.sourceforge.net/index.php?page=protocol (last visited May 21, 2001).
Philip J. Erdelsky, *The Birthday Paradox*, EFG, at http://www.efgh.com/math/birthday.htm (last visited Mar. 8, 2002).
*Red-Black Tree*, National Institute of Standards and Technology, at http://www.nist.gov/dads/HTML/redblack.html (last visited Mar. 5, 2002).
Lai, Kevin, and Mary Baker, *Measuring Link Bandwidths Using a Deterministic Model of Packet Delay*, at Department of Computer Science at Stanford University, 13 pages, no date.

(Continued)

*Primary Examiner*—Jeffrey Gaffin
*Assistant Examiner*—Yicun Wu
(74) *Attorney, Agent, or Firm*—Marshall, Gerstein & Borun LLP

(57) ABSTRACT

A simple record query language (SRQL) is a generic record meta-data query solution that can natively describe the information contained in a record and search each against it to find records whose meta-data matches a particular set of criteria. SRQL includes both a record data structure that includes searchable SRQL attributes that describe the record, and queries that are able to search the attributes. The attributes are an XML node that exists in the record header itself. There are two types of queries, to wit local to find records in the local data store, and distributed to find records that may be stored in a neighbor's data store. As such, SRQL finds particular applicability to peer-to-peer networks.

22 Claims, 3 Drawing Sheets

OTHER PUBLICATIONS

Rowstron, Antony, and Peter Druschel, *Pastry: Scalable, distributed object location and routing for large-scale peer-to-peer systems*, at Microsoft Research, Ltd., St. George House and Rice University, 20 pages, no date.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *Scribe: The design of a large-scale event notification infrastructure*, at Microsoft Research, Ltd., St. George House and Rice University, 20 pages, no date.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord, no date.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

\* cited by examiner

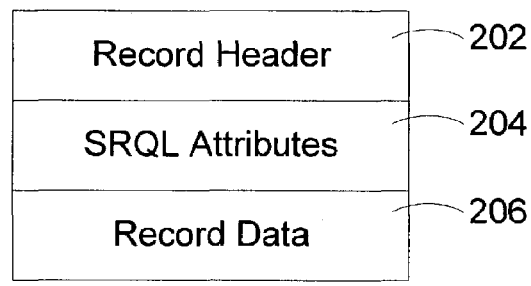
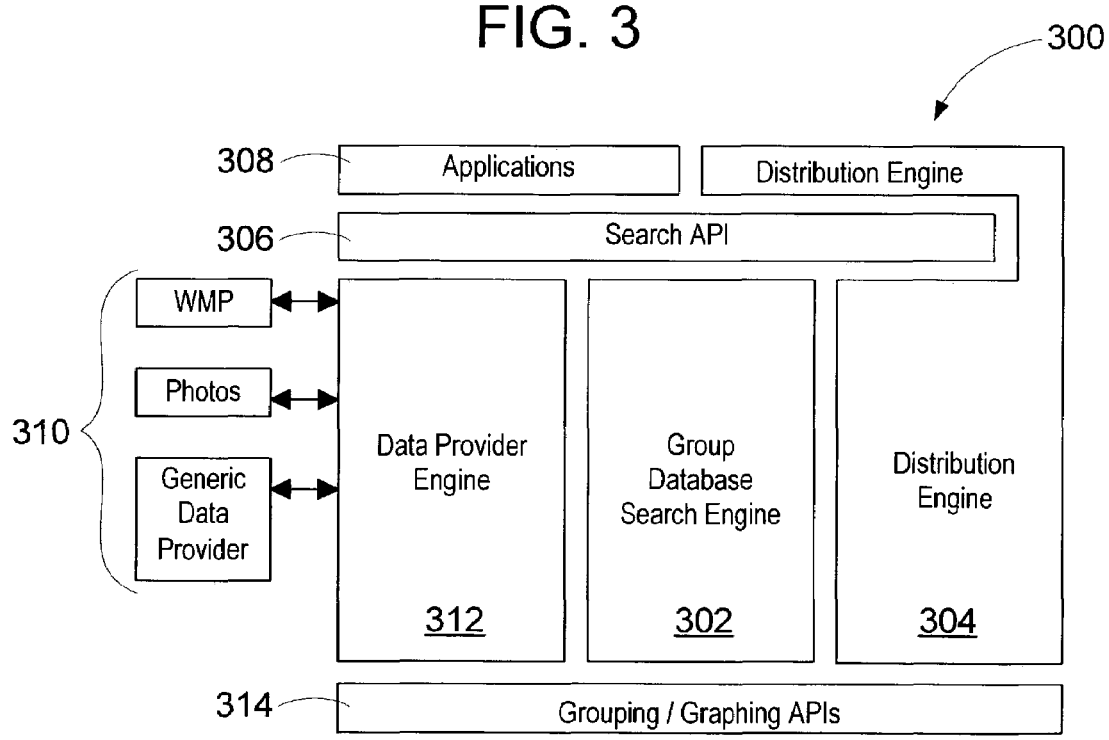

PEER-TO-PEER RECORD STRUCTURE AND QUERY LANGUAGE FOR SEARCHING AND DISCOVERY THEREOF

CROSS REFERENCE TO RELATED APPLICATIONS

Ser. No. 09/942,164, entitled Peer-To-Peer Name Resolution Protocol (PNRP) And Multilevel Cache For Use Therewith, filed on Aug. 29, 2001; Ser. No. 10/122,863, entitled Multi-Level Cache Architecture and Cache Management Method for Peer-To-Peer Name Resolution Protocol, filed Apr. 15, 2002; Ser. No. 09/955,923, entitled Peer-To-Peer Group Management and Method For Maintaining Peer-To-Peer Graphs, filed on Sep. 19, 2001; Ser. No. 09/956,260, entitled Peer-To-Peer Name Resolution Protocol (PNRP) Security Infrastructure And Method, filed on Sep. 19, 2001; Ser. No. 09/955,924, entitled Peer-To-Peer Name Resolution Protocol (PNRP) Group Security Infrastructure and Method, filed on Sep. 19, 2001; Ser. No. 10/309,865, entitled Peer-To-Peer Graphing Interfaces and Methods, filed on Dec. 4, 2002; Ser. No. 10/309,864, entitled Peer-To-Peer Identity Management Interfaces And Methods, filed on Dec. 4, 2002; Ser. No. 10/351,905, entitled Peer-To-Peer Grouping Interfaces and Methods, filed January 27, 2003.

FIELD OF THE INVENTION

The present invention relates generally to peer-to-peer network records and the discovery thereof, and more particularly to peer-to-peer record structures and application programming interfaces that provide local and distributed peer-to-peer record searching and discovery in a peer-to-peer network.

BACKGROUND OF THE INVENTION

Various communication technologies on the Internet allow users with common interest to collaborate, share files and other data records, chat with one another, multi-cast audio and video for presentations and group meetings, and engage in multi-player gaming. Currently, however, most communication and record sharing on the Internet takes place in a server centric environment whereby all communication flows to or through large central servers to which individuals may connect to join and participate in such communication.

With the reemergence of peer-to-peer technology, the current server centric model of Internet communication and record sharing is quickly being replaced. Indeed, peer-to-peer technologies enable users to contact one another and share records in a serverless environment, free from the constraints of server based Internet communication. In a peer-to-peer based system, a user's anonymity and privacy may be maintained since communication occurs directly between peers within the network.

Peer-to-peer communication, and in fact all types of communication, depends on the possibility of establishing valid connections between selected entities or nodes. These entities or nodes may be peers (e.g., users or machines) or groups formed within a peer-to-peer network. The connections between the nodes form the peer-to-peer graph that enables communication and information to be passed to and between the nodes. The nodes typically have assigned a stable name. Each peer is found within the peer-to-peer cloud by resolving this name to a current address when a connection is needed.

Because peer-to-peer networks are formed as a graph of distributed users or peers, it is necessary that communication be passed from one peer to another before all peers within a network may become cognizant of the shared information. In a typical peer-to-peer infrastructure nodes in a graph share such data via structured packets called records. Records can contain any kind of data imaginable from chat messages to pointers to files. However, while some information is shared between peers as a matter of course, a vast majority of information available from the peers is not shared until and unless a peer requests that information. Such a request is embodied in a search query for the record from a neighbor peer.

However, in order for a search to converge to the desired information, the query must somehow adequately identify the desired record stored in the neighbor peers data store. Unfortunately, a record in its base form inherently does not provide any mechanism by which to mark up and describe through meta-data the contents of the record to allow an intelligent query to locate it. Further, because peer-to-peer infrastructures are distributed systems, there is an ever present need to manage the amount of data and meta-data replicated amongst nodes in a graph. Replicating large amounts of meta-data to each node is not an option in today's bandwidth constrained networking infrastructure. Thus the size of the meta-data describing the record's contents needs to be appropriate. Further, there is currently no standard way of describing the contents of a record. As such, the success of any record search query for a particular record or type of record is not well defined. Similarly, if the search is successful, the number of records found that are returned often swamps or overwhelms the actual record content sought.

There exists, therefore, a need in the art for a peer record structure and method for describing the record content and a simple record query language that may be used to construct queries for specific records and record types.

BRIEF SUMMARY OF THE INVENTION

The inventive concepts disclosed in this application involve a new and improved peer-to-peer record data structure and simple record query search language (SRQL) that enables simple yet power searching for specified records. More particularly, the present invention presents a generic record meta-data solution that can describe the information contained in a record. This meta-data can then be queried against to find records whose meta-data matches a particular set of criteria.

In one embodiment of the present invention, the data structure of the peer-to-peer records includes an SRQL attributes data XML node that exists in the record header itself. This XML provides the developer a place to provide an attribute name, type, and value. A record can have 0–N attribute elements inside of a given attributes complex type. In one embodiment of the invention, there are three basic attribute types: string, int, and date where date follows the guidelines set by the W3C. However, in other embodiments of the invention, all existing and not yet existing types could be specified in a type field. Preferably, the record data structure of a record including the SRQL attributes of the present invention includes the record header field, the SRQL attributes field, and the record data itself.

In addition to the data structure of the peer records, the present invention provides the actual query able to search SRQL attributes. A SRQL query is able to function in multiple manners. The first manner is a strict matching query that allows an application to search based on one particular SRQL attribute. The second manner in which an SRQL query can function is by grouping together clauses via logic operators (ex. AND and OR). This enables developers to create complex and powerful queries in an easy and intuitive manner. Though only two simple logic functions are given in the example above, the preferred embodiment of the invention covers any logic operation in existence today or in the future. In addition to logic operator support, SRQL allows for different comparison mechanisms, such as equal, not equal, less or equal, greater or equal, greater, less, etc. SRQL also allows for the use of wildcards for non-exclusive searching. This means that a query could be made to find all records of a certain type. The SRQL is protocol independent and could be used in other protocols or products.

In one embodiment of the present invention, application programming interfaces (APIs) are provided that provide all of the support necessary for applications to both local and distributed searches of the group database for the queried records. The local searching API preferably resides at the same layer as other record management APIs, and provides the methods to retrieve individual records, iterate over all records or a certain type, etc., as well as actually querying the database. If the record sought does not exist in the local database, the search query is distributed to a neighbor via the graphing APIs. The neighbor then uses the query to perform a local search for the record on its local database. If the record is found, the neighbor sends a search results record back to the requesting peer. The requesting peer may then select which records from the results it would like to download to its local database from the neighbors who have the sought after records.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2 illustrates a simplified peer record data structure constructed in accordance with the teachings of the present invention;

FIG. 3 is a simplified block diagrammatic illustration of a peer networking search architecture constructed in accordance with the teachings of the present invention.

Figure 1:
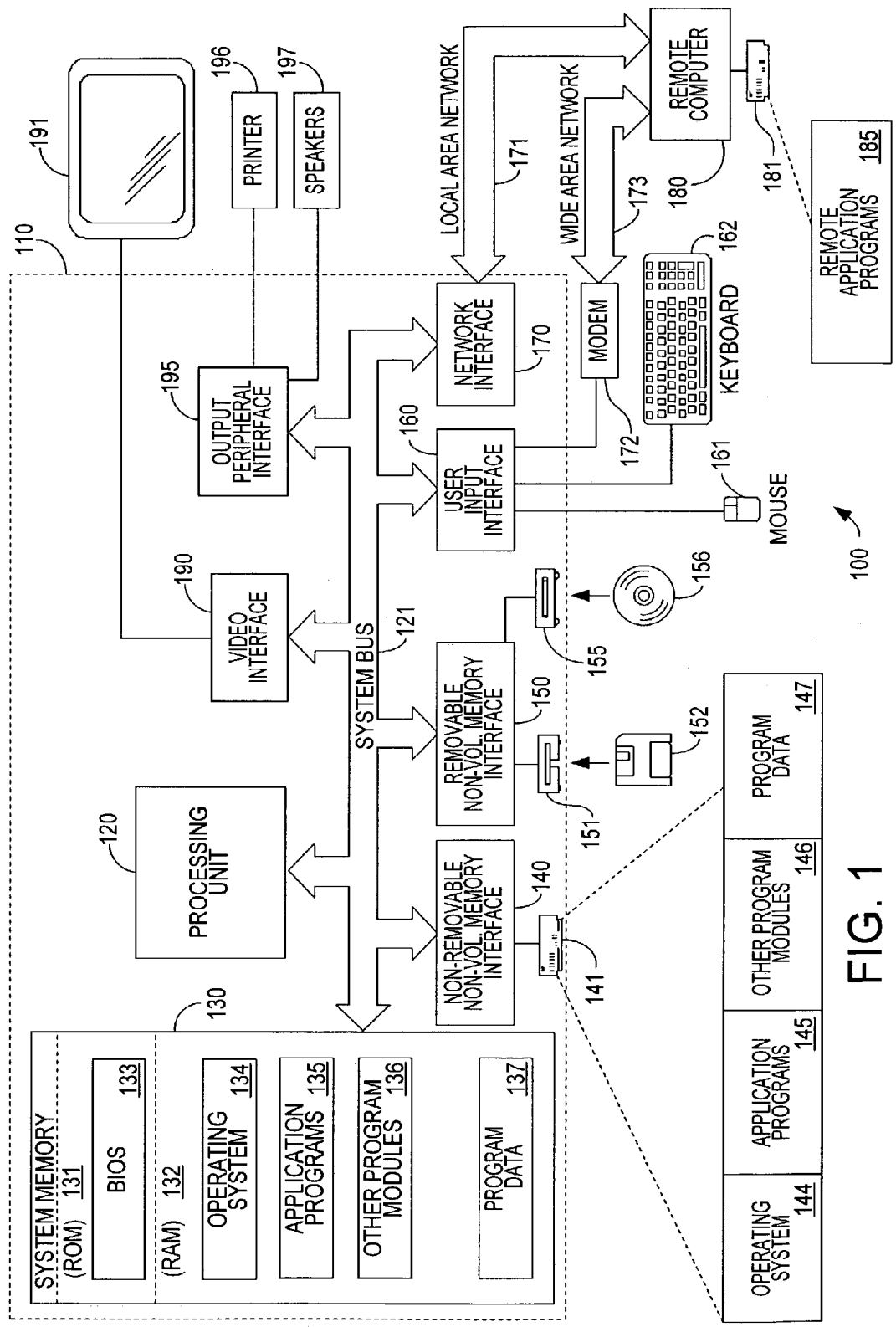
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network member, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities and to find and share information and records within the peer-to-peer cloud. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the simple record query language (SRQL) and method of the instant invention finds particular applicability, although by which the present invention is not limited, is described in co-pending application Ser. No. 09/942,164, entitled Peer-To-Peer Name Resolution Protocol (PNRP) And Multilevel Cache For Use Therewith, filed on Aug. 29, 2001, in co-pending application Ser. No. 10/122, 863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

However, one skilled in the art will recognize from the following teachings that the SRQL and methods of the present invention are not limited to the particular peer-to-peer protocol of these co-pending applications, but may be applied to other resolution and grouping protocols with equal force. Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the SRQL and methods of the present invention find particular applicability to and interaction with such PNRP, one skilled in the art will recognize that the present invention is not limited thereby, but has applicability to any P2P system or protocol that desires to provide a generic record meta-data structure and query system to find peer records.

As discussed in the above-incorporated co-pending application describing the PNRP, and to provide some useful background, establishing peering relations between individual peers is an expensive process in existing peer-to-peer networks. In the PNRP, however, each member accumulates a routing table that contains a list of references to other members in the network. For each member entry, address information, which may include a member identification, address, the key of the member, and the distance between the key of this member and the key of the local member are obtained. Each time the local member learns about a remote member, it checks whether the member is already known, and if not whether to enter an entry in the routing table.

To find a particular record in PNRP that is not resident in that member's local data store, it sends a record query to a member in its local cache. When that member receives a query for a record that it does not have, that member searches for the entry or record in its routing table whose key best matches the target. The query is then forwarded directly to the member that advertised the entry or record. If there is no adequate entry or record in its data store, the request is sent back to the member from whom the request was received; this member will try another neighbor in its own routing table. The request is successful if it reaches a member that has an entry or record whose key matches the target. It is unsuccessful if the target is not reached in the maximum number of steps, or if the member from whom the request was received tries all possible neighbors and receives a negative response. In the case of successful requests, the response is relayed by all intermediate hops. It carries the address of the member that held the target key, and this entry can be inserted in the routing tables of the intermediate members. Unfortunately, while PNRP and other peer-to-peer protocols define how queries are routed between the members of the peer cloud, it provides no adequate mechanism to actually search the data store for a particular record.

However, actually being able to find resources in a group is essential to the peer-to-peer user experience. In a peer-to-peer infrastructure such as that discussed above and in the co-pending applications, nodes in a graph share data via structured packets called records. Records can contain any kind of data imaginable from chat messages to pointers to files. The manner in which the data is distributed is key in determining the method of search. If each node has a copy of all the data, then the search can be conducted locally. If the data is distributed, a distributed search needs to be issued. Unfortunately, a record in its base form inherently does not provide a mechanism by which to mark up and describe through metadata the contents of the record. Recognizing this, the system and methods of the present invention provide a generic record meta-data solution that can describe the information contained in a record. In addition, the meta-data can be queried against to find records whose meta-data matches a particular set of criteria. This record meta-data/query solution is the Simple Record Query Language (SRQL) of the present invention. This SRQL provides an asynchronous keyword/attribute search for both local and distributed record searching. To reduce the network and peer resources utilized in one embodiment, the results of the search will be records corresponding to the data, not the data itself.

There are two key requirements that must be observed in a peer-to-peer network. The first is data size. Because, a peer-to-peer infrastructure is a distributed system, there is an ever present need to manage the amount of data and meta-data replicated amongst nodes in a graph. Replicating large amounts of meta-data to each node is not an option in today's bandwidth constrained networking infrastructure. Thus the size of the meta-data describing the record's contents needs to be appropriate. The second requirement is industry alignment. That is, the meta-data needs to be described via a common mechanism that allows developers to use pre-existing tools in order to utilize the meta-data associated with a record. After careful consideration, it was decided that the basis of the query language would be XML. However, this presents a problem as all other XML query mechanisms are relatively cumbersome and not able to satisfy the size requirement placed on the infrastructure.

Essentially, there are two main aspects of the Simple Record Query Language (SRQL) of the present invention resulting from these considerations. The first is the attributes data XML node 204 that exists in the record header 202 of the record 200 itself to describe the record data 206. This XML provides the developer a place to provide an attribute name, type, and value. As an example of attributes that may be included and on which the SRQL queries can be run, the record ID (unique identifier of the record), the record type (the UUID value of the record type), the creator (who published the record), the modified time (the last time of modification to the record), and the last modifier ID (the last person to modify the record) are searchable. An example of such a data island is as follows:

```
<attributes>
  <attribute name="FileName" type="string">skipicture.jpg</attribute>
<attributes>
```

In the above example, the developer has specified the following: name as "FileName" the type which is "string", and the actual value which exists between the beginning and end attribute tag, which is "skipicture.jpg".

A record can have 0–N<attribute>elements inside of a given <attributes>complex type. In one embodiment of the invention, there are three basic attribute types: string, int, and date, where date follows the guidelines set by the W3C. However, in one embodiment of the invention, all types could be specified in the "type" field. The following schema represents an exemplary implementation of this aspect of SRQL:

```
<?xml version="1.0" encoding="utf-8" ?>
<xs:schema xmlns:xs="http://www.w3.org/2001/XMLSchema">
  <xs:element name="attributes">
  <xs:complexType>
                    <xs:sequence>
  <xs:element name="attribute" type="attribute"
  minOccurs="0" maxOccurs="unbounded" />
    </xs:sequence>
    </xs:complexType>
    </xs:element>
    <xs:complexType name="attribute">
  <xs:simpleContent>
                   <xs:extension
                   base="xs:string">
  <xs:attribute name="name" type="xs:string" />
  <xs:attribute name="type" type="xs:string" />
                   </xs:extension>
  </xs:simpleContent>
    </xs:complexType>
      </xs:schema>
```

To utilize the SRQL attributes, the SRQL of the present invention allows peers to construct queries that are able to search the attributes and find the desired records. A SRQL query is able to function in multiple manners. The first manner is a strict matching query that allows an application to search based on one particular SRQL attribute. Given the following SRQL attributes:

```
<attributes>
  <attrib attribName="FileName" type="string">ski.jpg</attrib>
  <attrib attribName="FileSize" type="int">123456</attrib>
<attributes>
```

The following SRQL query is constructed to match the file name:

```
<peersearch>
  <clause attribName="FileName" type="string" compare="equal">ski.
  jpg</clause>
</peersearch>
```

This particular SRQL query would look for an attribute name=FileName, whose type=string, where FileName=skipicture.jpg.

The second manner in which an SRQL query can function is by grouping together clauses via logic operators (ex. "AND" and "OR"). This enables developers to create complex and powerful queries in an easy and intuitive manner. An example given the attributes above is as follows to match the first part of the file name and a minimum file size:

```
</peersearch>
  <and>
    <clause attribName="FileName" type="string" compare="equal">
    ski*</clause>
    <clause attribName="FileSize" type="int" compare="greaterthan">
    10000</clause>
  <and>
</peersearch>
```

The above clause would search for records that contain meta-data that matches FileName="skipicture.jpg" and whose FileSize is greater than 10000.

Though the embodiment of SRQL discussed above only provides two simple logic functions, one skilled in art will recognize that an embodiment of the invention includes any logic operation. In addition to logic operator support, SRQL allows for different comparison mechanisms, e.g. equal, not equal, less or equal, greater or equal, greater, less, etc. Further, SRQL also allows for the use of wildcards. This means that a query could be made to find all records of a certain type. For example:

```
<peersearch>
  <clause attrib="FileName" type="string" compare="equal">*.
  jpg</clause>
  <peersearch>
```

The above query would search for all records that had a .jpg ending to value specified by the FileName attribute. Both the '?' and the '*' characters are implemented in one embodiment, and other embodiments of the invention provide support for other such wildcards.

An exemplary schema for one embodiment of th SRQL query is as follows:

```
<?xml version="1.0" encoding="utf-8" ?>
<xs:schema xmlns:xs="http://www.w3.org/2001/XMLSchema">
  <xs:complexType name="clause">
  <xs:simpleContent>
                   <xs:extension base="xs:string">
  <xs:attribute name="attrib" type="xs:string" />
  <xs:attribute name="type" type="xs:string"
  default="string" />
    <xs:attribute name="compare" type="xs:string"
```

```
-continued default="equal" />
        </xs:extension>
      </xs:simpleContent>
    </xs:complexType>
    <xs:complexType name="and">
      <xs:sequence>
            <xs:element name="clause" type="clause"
maxOccurs="unbounded" minOccurs="0" />
        <xs:element name="or" type="or" maxOccurs="unbounded"
minOccurs="0" />
        <xs:element name="and" type="or" maxOccurs="unbounded"
minOccurs="0" />
      </xs:sequence>
    </xs:complexType>
    <xs:complexType name="or">
      <xs:sequence>
            <xs:element name="clause" type="clause"
maxOccurs="unbounded" minOccurs="0" />
        <xs:element name="and" type="and" maxOccurs="unbounded"
minOccurs="0" />
        <xs:element name="or" type="and" maxOccurs="unbounded"
minOccurs="0" />
      </xs:sequence>
    </xs:complexType>
    <xs:element name="peersearch">
  <xs:complexType>
            <xs:choice>
  <xs:element name="clause" type="clause"/>
  <xs:element name="and" type="and"/>
  <xs:element name="or" type="or"/>
            </xs:choice>
  </xs:complexType>
    </xs:element>
</xs:schema>
```

It is instructional to note that the SRQL language is comprised of both parts: Attributes and Queries. It is also important to note that the SRQL is protocol independent and could be used in other protocols or products.

Having now described the particulars of the SRQL of the present invention, both the attributes and the queries, the following discussion will focus on a peer-to-peer environment to which the SRQL of the present invention finds particular applicability. As illustrated in FIG. 3, the peer networking architecture 300 of the present invention provides a modular search architecture that allows for two distinct search engines to exist and operate within a group context. The engines are local 302 and distributed search engines 304. A local engine 302 is one that searches only the machine it is on, while a distributed search engine 304 is one that sends a search request to neighbor peers in the group. Both of these search engines are callable by an application 308 via one search application programming interface (API) 306.

In this FIG. 3 the search API 306 is the module that calls the correct engine based on the parameters of the search query. The group database search engine 302 is the module that searches the group database for the various types of records 310. The group database includes all information that was flooded in the group context. A search that is conducted using this module 302 returns all information that has been flooded to the group. The data provider engine 312 allows applications to register to accept search queries. They can then return the appropriate information to the requesting application. This is because some applications may not choose to publish data into the group database. They may choose to continue to keep data within their own database. In such situations, the applications know the best way to analyze the queries made. The distribution engine 304 determines how non-local search requests are replicated across the group. Since some distribution engines may wish to affect the shape and connectivity of the nodes in the group specified by the grouping and graphing APIs 314, only one distribution engine can be specified for a group.

A description of one embodiment of peer graphing interfaces is contained in co-pending application Ser. No. 10/309,865, entitled Peer-To-Peer Graphing Interfaces and Methods, filed on Dec. 4, 2002, the teaching and disclosure of which are hereby incorporated in their entireties by reference thereto. A typical infrastructure also includes identity interfaces. A description of one embodiment of these identity management interfaces is contained in co-pending application Ser. No. 10/309,864, entitled Peer-To-Peer Identity Management Interfaces And Methods, filed on Dec. 4, 2002, the teachings and disclosure of which are hereby incorporated in their entireties by reference thereto. Finally, a set of grouping interfaces are also provided to allow proper participation in P2P groups. A description of one embodiment of such grouping interfaces is contained in co-pending application Ser. No. 10/351,905, entitled Peer-To-Peer Grouping Interfaces and Methods, filed on even date herewith, the teachings and disclosure of which are hereby incorporated in their entireties by reference thereto.

The main addition to the current APIs (and the focus of this document) is the addition of an actual "Search" API. This "search" API will be specified below. The actual implementation of it will live in the same layer as the rest of the record management APIs. The parameters of the peer graph search API include a handle to the graph associated with the query, an XML string representing the search criteria, and a handle to a newly allocated record enumerator used to iterate over each of the records returned from the search. The peer group get next item API discussed in the grouping API co-pending application discussed above should be used to retrieve the actual records returned. The peer graph search API returns an indication of success or failure. The failure indications include an indication that the handle to the graph is invalid, that the search string is NULL or the handle to the record enumerator is NULL, or the XML string is invalid.

As indicated above, the search API accepts a string as a parameter. The string is a XML document following a format specified herein. If the user is trying to query against a attribute of type 'string,' wildcard matches are allowed. Since SQL uses different wildcards than users are used to, a mapping is provided when SQL is used.

TABLE 1

| szValue characters | meaning |
|---|---|
| * | wildcard, matches 0–n characters |
| \* | matches exactly 1 asterisk |
| ? | Wildcard, matches any 1 char. |
| \? | Matches exactly 1 question mark |
| \\ | matches exactly 1 backslash |
| \n | matches exactly backslash followed by the character n, where n is any character except* or \. |

Internally, all text queries preferably use the LIKE operator of SQL Lite, with the escape character set to backslash as follows:

select id from attributes where value LIKE '% ski
      trip %' ESCAPE\

Note that SQL uses % for its wildcard character, and that _ (underscore) is used to mean 'any 1 character'. Full mapping from szValue to actual SQL query is:

TABLE 2

| szValue characters | SQL characters |
|---|---|
| * | % |
| \* | * |
| ? | _ (underscore) |
| \? | ? |
| \\ | \\ |
| \n | \\n |
| % | \% |
| _ | \_ |

A query will be built and ran against the Attributes table on the associated database connection. The actual query will use a join, similar to this example:

```
SELECT DISTINCT t1.recordid
FROM attribs t1
JOIN attribs t2 ON t1.recordid = t2.recordid
JOIN attribs t3 ON t1.recordid = t3.recordid
WHERE
    t1.Attribute = 'Name' AND t1.StringValue = 'Scott' AND
    t2.Attribute = 'Age' AND t2.IntValue < 30 AND
    t3.Attribute = 'Birthday' AND t3.DateValue = '4/4/1972';
```

As seen in the query, the database will be constructed such that the attribute table will have multiple columns for a value, one for each possible type. The correct column will be specified in the query, based on the type of value that is being queried. Unused columns in the table (there will be NumTypes—1 unused columns) will be set to NULL and take very minimal space.

In an alternate embodiment, all values are stored in 1 column, which is converted when doing the query. However, having multiple columns is preferred because convert is an expensive operation (best performed once, at insert time), better performance may be realized with indexed columns, and there is no significant increase in database size for the additional columns in a sparse table.

Given the hGraph, internally a connection to the database will be obtained, and the actual query will be executed using roughly the same mechanism as the PeerGraphEnumRecords API discussed in the above co-pending application. HPEERENUM returned should be handed off to PeerGraphGetNextItem to retrieve the actual records associated with the query, and PeerGraphEndEnumeration should be used to free any resources.

Figure 4:
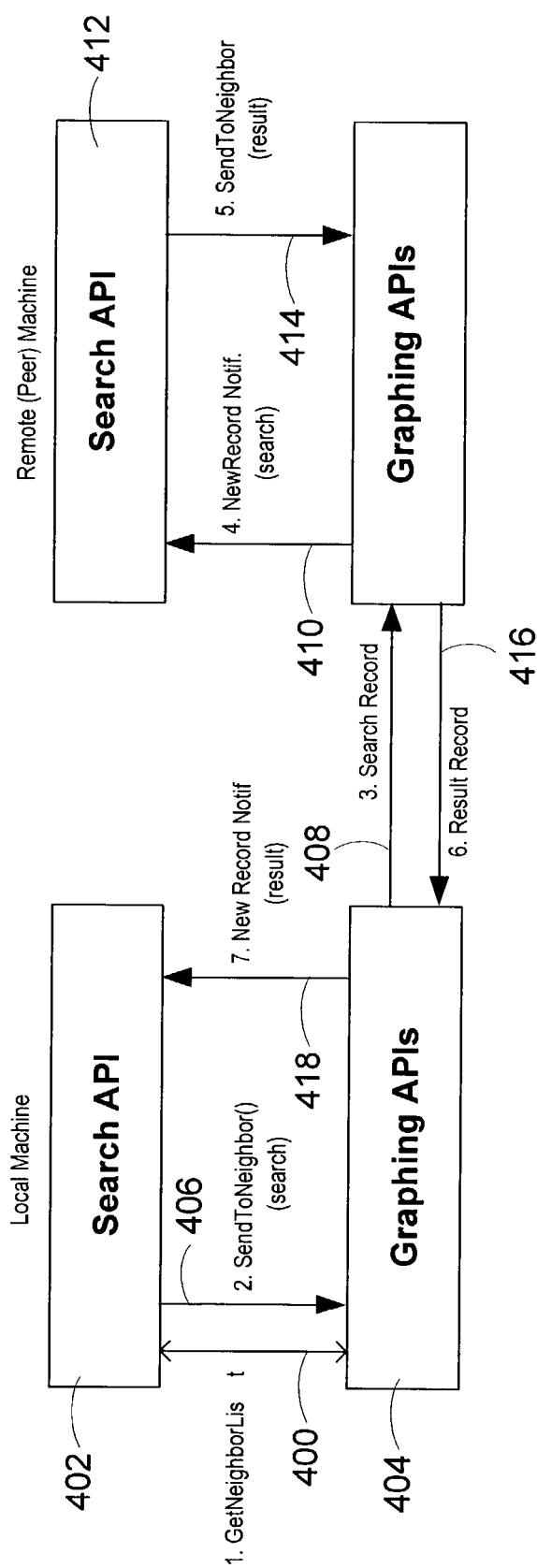
FIG. 4 is a simplified communication diagram illustrating a distributed search flow in accordance with an embodiment of the present invention.

With this discussion, everything necessary to enable distributed searching has already been specified. The main APIs that enable this are the get neighbor list, send to neighbor, and the record notification API's discussed in the above co-pending applications. FIG. 4 illustrates the process that takes place to search a remote machine in accordance with one embodiment of the present invention. First 400, the search API 402 calls into the graphing layer 404 to retrieve the list of neighbors. With this list, the searching layer 402 could choose to send a search request to one neighbor or many, depending on its needs. The searching API 402 would use the SendToNeighbor API 406 to send a record to one (or more) of its neighbors. It is up to the search API 402 to define a user-defined record type appropriate for a search request.

The underlying socket layer would actually send 408 the search request record to the specified neighbor. In the neighbor machine, the receipt of the search record will fire a "new record" event 410. It is up to the searching layer 412 to register to be notified of incoming search request records. When the search request is received, it will be propagated to the search API 412. At this point the searching layer would do whatever searching was appropriate, including possibly calling back into the record management layer to call the search API.

For each matching record found based on the search criteria, the searching layer would call SendToNeighbor 414 to send a "search result" record back to the caller. It is up to the searching layer to define the new user defined record type. At this point, the searching layer may also decide to propagate the search request to its neighbors in the same fashion as in step 406. The underlying socket layer would send 416 the actual search result record back to the caller. In the caller, a "new record" event will fire 418. The searching layer must have previously registered for the new record event when the type is "search result". When this event is fired, the searching layer will now have a search hit to use. One event will be fired for each search hit.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use comtemplated. All such modifications and variations are within the scope of the invention as determined by the appended claims when interpreted in accordance with the breadth to which they are fairly, legally, and equitably entitled.

What is claimed is:

1. A method of communicating between an application program and a server process to search a peer-to-peer data store, comprising the steps of:
   receiving from the application program at a peer device a peer graph search call having a plurality of call parameters;
   parsing the peer graph search call to retrieve the call parameters;
   matching the call parameters to data store attribute data corresponding to data store record data at the peer device; and
   returning to the application program only a value indicative of the success/failure of matching the call parameters to the data store attribute data.

2. The method of claim 1, wherein the step of receiving from the application program the peer graph search call having a plurality of call parameters comprises the step of receiving from the application program the peer graph search call having a plurality of call parameters including a handle to a peer graph associated with the peer graph search call, search criteria, and a handle to a record enumerator used to iterate over each record returned.

3. The method of claim 2, wherein the search criteria comprises an XML string representing the search criteria.

4. A method of sharing records in a peer-to-peer infrastructure, comprising the steps of:
   storing in a data store on a computer a record data structure having a first data field containing data representing peer-to-peer record header information, a second data field containing data representing peer-to-peer record attribute information corresponding to record data in a third data field of the record data structure, and the third data field containing record data;

receiving at the computer a query specifying record search criteria; searching only the peer-to-peer record attribute information based on the record search criteria; and sending a record found notification and no record data when a record data structure having peer-to-peer record attribute information matching the search criteria is found in the step of searching.

5. The method of claim 4, wherein the step of searching comprises the steps of calling a search application programming interface (API), and passing the record search criteria to the search API.

6. The method of claim 4, wherein the step of receiving a query specifying record search criteria comprises the step of receiving a query specifying record search criteria as an XML string query.

7. A method of claim 6, wherein the XML string query includes a strict matching query that allows searching on one particular peer-to-peer record attribute.

8. The method of claim 6, wherein the XML string query includes a grouping of clauses via a logical operator that allows searching on a logical grouping of particular peer-to-peer record attributes.

9. The method of claim 6, wherein the XML string query includes a grouping of clauses via a comparative operator that allows searching on a comparative grouping of particular peer-to-peer record attributes.

10. The method of claim 6, wherein the XML string query includes at least one wildcard that allows non-exclusive searching on peer-to-peer record attributes.

11. A method of searching for records in a peer-to-peer infrastructure, comprising the steps of:

constructing a query specifying record search criteria to be compared to a record data structure stored on at least one neighbor peer having a first data field containing data representing peer-to-peer record header information, a second data field containing data representing peer-to-peer record attribute information about record data in a third data field, and the third data field containing the record data;

sending the query to the at least one neighbor peer;

receiving a new record notification and no record data from the neighbor peer when a record data structure having peer-to-peer record attribute information matching the search criteria is found by the neighbor peer; and requesting record data having the peer-to-peer record attribute information matching the search criteria from the at least one neighbor peer according to the new record notification.

12. The method of claim 11, wherein the step of constructing a query specifying record search criteria comprises the step of constructing a query specifying record search criteria as an XML string query.

13. The method of claim 12, wherein the XML string query includes a strict matching query that requires searching on one particular peer-to-peer record attribute.

14. The method of claim 12, wherein the XML string query includes a grouping of clauses via a logical operator that requires searching on a logical grouping of particular peer-to-peer record attributes.

15. The method of claim 12, wherein the XML string query includes a grouping of clauses via a comparative operator that requires searching on a comparative grouping of particular peer-to-peer record attributes.

16. The method of claim 12, wherein the XML string query includes at least one wildcard that requires non-exclusive searching on peer-to-peer record attributes.

17. A computer participating in a peer-to-peer network having a plurality of peer-to-peer network devices, the computer having a computer-readable medium with computer executable instructions implementing a method comprising:

storing on the computer a data structure including a header, record data, and record attribute information corresponding to the record data;

receiving from another peer device an XML format string comprising a query specifying record search criteria;

searching only the record attribute information to determine if the record data matches the record search criteria;

returning to the peer device a result in an XML format string indicating only whether the computer has a stored data structure that matches the record search criteria; and receiving a request from the another peer device a request for the record data, when the result indicates the record data is present on the computer and when the another peer device determines to request the record data.

18. The method of claim 17, further comprising storing a plurality of data structures, each including a respective header, a respective record data, and a respective record attribute information corresponding to the record data;

searching the each of the plurality of respective record attribute information to determine if any record data matches the record search criteria; and returning to the peer device another result in an XML format string indicating only whether the computer has one or more of the plurality of data structures that matches the record attribute criteria.

19. The method of claim 18, wherein the XML string query includes a strict matching query that requires searching each of the plurality of data structure record attributes for one particular peer-to-peer record attribute.

20. The method of claim 18, wherein the XML string query includes a grouping of clauses via a logical operator that requires searching each of the plurality of data structure record attributes on a logical grouping of particular peer-to-peer record attributes.

21. The method of claim 18, wherein the XML string query includes a grouping of clauses via a comparative operator that requires searching each of the plurality of data structure record attributes on a comparative grouping of particular peer-to-peer record attributes.

22. The method of claim 18, wherein the XML string query includes at least one wildcard that requires non-exclusive searching of each of the plurality data structure record attributes on peer-to-peer record attributes.

* * * * *